G. C. KENNEDY.
SEED TESTER.
APPLICATION FILED DEC. 9, 1911.
1,053,733.
Patented Feb. 18, 1913.
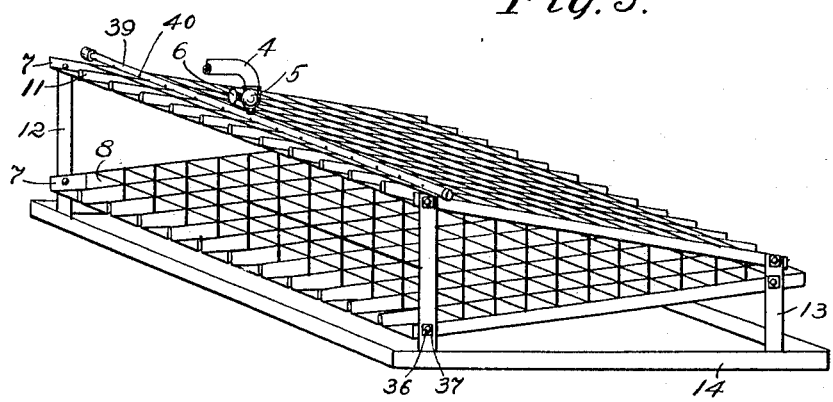
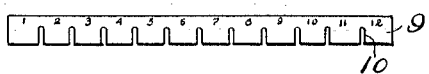
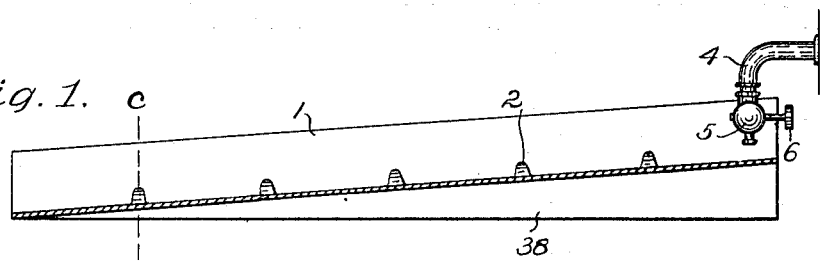
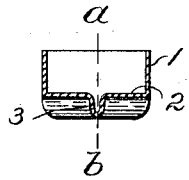
Witnesses:
E. C. Jennings
W. H. Brunn
Inventor,
George C. Kennedy

UNITED STATES PATENT OFFICE.

GEORGE COLVIN KENNEDY, OF WATERLOO, IOWA.

SEED-TESTER.

1,053,733.  Specification of Letters Patent.  Patented Feb. 18, 1913.

Application filed December 9, 1911. Serial No. 664,742.

*To all whom it may concern:*

Be it known that I, GEORGE COLVIN KENNEDY, a citizen of the United States of America, and a resident of Waterloo, Blackhawk county, Iowa, have invented certain new and useful Improvements in Seed-Testers, of which the following is a specification.

My invention relates to improvements in seed testers, and the objects of my improvements are, first, to supply a seed testing device adapted to be continuously supplied with a determined amount of moisture with means for suitably and continuously draining the same; and second to so arrange the parts of the device as to render them easily knocked down for purposes of storage. These objects I have accomplished by the means which are hereinafter described and claimed, and which are illustrated in the accompanying drawings, in which:

Figure 1 is a medial longitudinal section taken through a simple form of my seed testing device which is formed to include the principles of my invention, taken on the line *a—b* of Fig. 2. Fig. 2 is a transverse vertical section of the device shown in Fig. 1, taken on the line *c—d* of the latter figure. Fig. 3 is a perspective view of a seed testing device which shows a combination of a coöperating number of my seed containing units. Fig. 4 is an end elevation of a plurality of such grouped units, with detachable disconnected separating devices forming partitions therein. Fig. 5 is a front elevation of several of such separating devices integrally connected.

Similar numerals of reference denote similar parts throughout the several views.

In the ordinary type of seed testers in which water is supplied to keep the seed moist, there is no proper provision for continuously supplying such moisture nor for as continuously draining away the moisture in order to secure a circulation of the water about the seeds, and this condition tends to cause a stagnation and fouling of the water which in turn reacts upon the seeds to rot them or destroy the vitality of their germs before the viability of the latter can overcome the adverse condition. The peculiar form and position of my device prevents this result, by permitting a constant circulation of the moisture constantly supplied to the seeds and withdrawal of such moisture as constantly as supplied, as does nature in the subsoil action of ground currents of moisture in properly drained areas when seeded.

My device therefore consists essentially of an inclined plane of a low but sufficient degree of inclination, adapted to receive the seed to be tested, and formed in compartments by bending or by means of division contrivances so as to segregate similar quantities of seeds therein for separate testing under the action of a common influence.

The device may comprise a single inclined trough-shaped surface 1, with or without division partitions 2, as desired to test one or more selections of seed at a time. The inclined trough 1 is shown as having its bottom crimped upwardly to form vertical transverse ridges 2, which in turn are downwardly and medially crimped at 3 to provide a medial channel for water without interfering with the separating function of such ridges. The trough with its plurality of water conducting but seed-separating partitions may be easily and inexpensively shaped from a narrow plate of material by means of a suitable forming-machine supplied with proper counterpart shaping-rollers.

The trough 1 is shown as supported on a block 38 having an upper sloped surface of the right inclination. Water is supplied to the uppermost end of the trough by means of the faucet 4 supplied with a valve-chamber 5 containing a valve adapted to be adjustably opened by means of a hand-wheel 6 on its projecting stem. The proper supply of water may be thus regulated so as to furnish a continuous flow through the trough, and the circulating moisture is caused to drain away by reason of the inclination of the trough as soon as supplied, escaping at the bottom of the trough.

The seed is deposited in the trough between the transverse ridges 2, and may be embedded there in earth or other suitable porous seed-fostering materials, and the water after circulating slowly about them moves on downward through the depressions 3 of the ridges. Since the supply of water may be slow, drop by drop, the seed are not washed away nor displaced, and cannot be floated up or moved down past the division ridges.

The above represents the simplest form of tester containing my essential principles of construction.

The device shown in Fig. 3 shows a plate which is longitudinally crimped to form a plurality of seed-containing troughs 7 separated by the raised crimps 11, said plate being supported in an inclined position over and with the lower ends of its troughs delivering into the upper ends of the similar troughs of a reversely-inclined crimped plate below. Said plates are supported by standards 12 and 13 and secured detachably to said standards by means of the bolts 36 and nuts 37. The lower ends of said standards may be detachably seated in a shallow basin or receiving-tank 14, which receives the drainage from said troughs 7, and a supply of water is furnished to the troughs by means of a faucet 4 having a valve-chamber 5 supplied with a regulating valve delivering into a closed-end horizontal tube 39 having perforations 40, one perforation for each trough and adapted to deliver thereinto. The troughs may be as previously described, or may be formed with a flat bottom, and in the latter case, detachable division contrivances 8 or 9 may be used to separate the troughs into a plurality of communicating compartments. The separating plates 8 are single and made wide enougth to slightly bind within the troughs when crossing them, so as to be held a little apart from the bottoms of the troughs to permit water to drain thereunder, but not far enough away to allow the seeds in one compartment to become commingled with those in another. The tops of said plates 8 may be numbered serially to indicate the sources of the seed deposited in the adjacent compartments. The division contrivance shown in Fig. 5 is made from a single plate of material having a plurality of notches cut in one edge to fit it over the crimps 11 of the plates. Fixed partitions may also be placed in said troughs if desired, with provision for a proper circulation of water thereby or therethrough.

Having described my invention, what I claim as new, and desire to secure by Letters Patent, is:

1. In a seed tester, an inclined impervious support having seed-retaining pockets therein, and means for supplying moisture to the upper end of said support to circulate over said pockets.

2. In a seed tester, an inclined body having a plurality of permeable seed retaining devices alined therealong longitudinally.

3. In a seed tester, an inclined body having a plurality of permeable seed retaining devices alined therealong longitudinally, and means for maintaining a circulation of liquid through said devices over said body.

4. In a seed tester, an inclined trough-shaped support, and a plurality of seed-retaining compartments therein.

5. In a seed tester, an inclined trough-shaped support, and a plurality of removable seed-retaining contrivances spaced apart therein.

6. In a seed tester, an inclined trough-shaped support, and a plurality of permeable seed-retaining devices spaced apart therein.

7. In a seed tester, an inclined trough-shaped body, and a plurality of seed-retaining devices arranged therein and adapted to permit liquid to pass therebetween.

8. In a seed tester, an inclined trough-shaped body, and a plurality of removable seed-retaining devices arranged therein and supported thereon and adapted to permit liquid to pass therebetween.

9. In a seed tester, an inclined troughed structure, division-contrivances therein, and means for furnishing a regulated supply of moisture to the upper part of said structure above said contrivances.

10. In a seed tester, an inclined troughed structure, and means for segregating seeds therein for separate testing, adapted to permit a circulation of a liquid about such seeds.

11. In a seed tester, an inclined troughed structure, means for segregating seeds therein for testing in separated groups and adapted to permit circulation of a liquid about said seeds, and means for furnishing a constant supply of liquid to said structure.

12. In a seed tester, an inclined trough-shaped body, means for segregating seed therein in groups for separate simultaneous testing adapted to permit a circulation of liquid therethrough, and means for supplying a constant delivery of warmed liquid to the upper part of said body to pass downward thereover through said segregating means.

13. In a seed tester, an inclined impervious support having permeable seed-retaining means thereon.

14. In a seed tester, an inclined impervious support having permeable seed-retaining means thereon, means for conducting a flow of liquid to said seed-retaining means, and a receptacle for the drainage from said support.

15. In a seed tester, an inclined body having a plurality of permeable seed-retaining means thereon, means for conducting a flow of liquid to said support to flow downward thereover through said means, a receptacle for the drainage from said support, and separable supporting connections between said parts.

16. In a seed tester, a longitudinally crimped inclined support, and a plurality of seed-retaining means spaced apart and seated transversely of the crimps on said support.

17. In a seed tester, a longitudinally crimped inclined support, and a plurality of permeable seed-retaining means spaced apart and seated transversely of the crimps in said support.

18. In a seed tester, longitudinally crimped inclined bodies, the lowermost part of one body being adapted to deliver into the uppermost part of the other.

19. In a seed tester, longitudinally crimped inclined bodies, the lowermost part of one body being adapted to deliver into the uppermost part of the other, and seed-retaining means arranged upon said bodies.

20. In a seed tester, longitudinally crimped inclined bodies, with the troughs of the one delivering respectively into the troughs of the other.

21. In a seed tester, an inclined base having longitudinal and transverse rows of seed-retaining devices thereon permeable to the flow of liquid therethrough.

22. In a seed tester, an inclined base having thereupon a plurality of separating means for securing seed to be tested thereon.

23. In a seed tester, an inclined body, and means for segregating seeds apart thereon for separated testing.

Signed at Waterloo, Iowa, this 6th day of Dec. 1911.

GEORGE COLVIN KENNEDY.

Witnesses:
E. C. JENNINGS,
W. H. BRUNN.

---

Copies of this patent may be obtained for five cents each, by addressing the "Commissioner of Patents, Washington, D. C."